(12) United States Patent
Pulek et al.

(10) Patent No.: US 6,939,466 B2
(45) Date of Patent: Sep. 6, 2005

(54) GRADED PARTICLE-SIZE RETENTION FILTER MEDIUM FOR FLUID FILTRATION UNIT WITH IMPROVED EDGE SEAL

(75) Inventors: John L. Pulek, Cheshire, CT (US); William A. Larsen, Southington, CT (US); C. Thomas Paul, Madison, CT (US); Clifford L. Schorr, Cheshire, CT (US); Francis J. Swiatek, Stafford Springs, CT (US); Art Artinyan, Belvidere, NJ (US)

(73) Assignee: Cuno Incorporated, Meriden, CT (US)

( * ) Notice: Subject to any disclaimer, the term of this patent is extended or adjusted under 35 U.S.C. 154(b) by 190 days.

(21) Appl. No.: 10/269,820

(22) Filed: Oct. 11, 2002

(65) Prior Publication Data

US 2003/0173283 A1 Sep. 18, 2003

Related U.S. Application Data

(63) Continuation-in-part of application No. 09/779,393, filed on Feb. 8, 2001, now Pat. No. 6,464,084, which is a continuation-in-part of application No. 09/498,251, filed on Feb. 3, 2000, now Pat. No. 6,712,966, and a continuation of application No. 09/135,489, filed on Aug. 17, 1998, now abandoned.

(60) Provisional application No. 60/118,603, filed on Feb. 4, 1999.

(51) Int. Cl.$^7$ ............................................. B01D 29/41

(52) U.S. Cl. ............. 210/317; 210/321.61; 210/321.75; 210/486; 210/491; 210/500.1; 210/502.1; 210/504

(58) Field of Search .............................. 210/317, 321.6, 210/321.61, 321.75, 321.77, 321.84, 321.86, 346, 347, 486, 487, 489, 490, 491, 500.1, 500.38, 502.1, 503, 504, 505, 508, 509; 55/487; 428/304.4, 311.11, 311.51, 311.71, 315.5

(56) References Cited

U.S. PATENT DOCUMENTS

| | | | |
|---|---|---|---|
| 2,444,147 A | 6/1948 | Walton | |
| 2,639,251 A | 5/1953 | Kracklauer | |
| 2,788,901 A | 4/1957 | Boeddinghaus et al. | |

(Continued)

FOREIGN PATENT DOCUMENTS

| | | | |
|---|---|---|---|
| DE | 198 37 257 A2 | 2/2000 | |
| JP | 22904 | 2/1985 | ............ 210/321.84 |
| JP | 5-2709 | 1/1993 | |
| JP | 3278517 | 11/1998 | ................ 210/518 |
| RU | 788480 | 7/1992 | |
| WO | WO 00/10684 | 2/2000 | |

OTHER PUBLICATIONS

Zeta Plus Generation H Series Filter Cartridge—Patent No.: 4,309,247.

(Continued)

Primary Examiner—Matthew O. Savage
(74) Attorney, Agent, or Firm—R. Thomas Payne; John A. Tomich

(57) ABSTRACT

A fluid filtration unit having two or more filter medium layers and/or zones, at least one of the layers/zones having a different particle retention capability disposed on each side of a non-filtering separator element. The filter medium are presently preferably positioned such that each succeedingly distal filter layer or zone from the separator has a decreased particle retention capability than each proceeding filter layer or zone. The filter medium layer most proximal to the separator element may be separated from the separator by a support material for supporting such filter medium element and preventing collapsing of the medium into any separator conduit. At least one of the medium elements is formed from a material which swells in size due to fluid absorption with the various zones and the separator being operatively connected by a new and innovative edge seal. The new and innovative edge seal is presently preferably formed from a thermoplastic material having a modulus of elasticity which is sufficient to permit radial expansion of the edge seal when the unit medium swells in size.

32 Claims, 4 Drawing Sheets

U.S. PATENT DOCUMENTS

| | | | |
|---|---|---|---|
| 3,005,556 A | 10/1961 | Jensen |
| 3,259,248 A | 7/1966 | Wiegand |
| 3,382,985 A | 5/1968 | Muehl |
| 3,452,877 A | 7/1969 | Mesek et al. |
| 3,486,627 A | 12/1969 | Ashby et al. |
| 3,493,119 A | 2/1970 | Allen |
| 3,537,592 A | 11/1970 | Ogden et al. |
| 3,618,783 A | 11/1971 | Cuyler |
| 3,735,871 A | 5/1973 | Bisko |
| 3,935,110 A | 1/1976 | Schmid et al. |
| 4,007,113 A | 2/1977 | Ostreicher |
| 4,007,114 A | 2/1977 | Ostreicher |
| 4,115,277 A | 9/1978 | Swank |
| 4,309,247 A | 1/1982 | Hou et al. |
| 4,347,208 A | 8/1982 | Southall |
| 4,430,232 A | 2/1984 | Doucet |
| 4,606,824 A | 8/1986 | Chu et al. |
| 4,637,876 A | 1/1987 | Dosoudil |
| 4,661,255 A | 4/1987 | Aumann et al. |
| 4,704,207 A | 11/1987 | Chu |
| 4,707,265 A | 11/1987 | Barnes et al. |
| 4,714,647 A | 12/1987 | Shipp, Jr. et al. |
| 4,726,901 A | 2/1988 | Pall et al. |
| 4,783,262 A | 11/1988 | Ostreicher et al. |
| 4,859,340 A | 8/1989 | Hou et al. |
| 4,881,313 A | 11/1989 | Artinyan et al. |
| 4,900,346 A | 2/1990 | Lutz |
| 4,948,561 A | 8/1990 | Hinckley et al. |
| 4,981,591 A | 1/1991 | Ostreicher |
| 5,011,555 A | 4/1991 | Sager |
| 5,030,349 A | 7/1991 | Drori |
| 5,055,192 A | 10/1991 | Artinyan et al. |
| 5,062,864 A | 11/1991 | Hasegawa et al. |
| 5,069,789 A | 12/1991 | Mohn et al. |
| 5,085,780 A | 2/1992 | Ostreicher |
| 5,085,784 A | 2/1992 | Ostreicher |
| 5,102,542 A | 4/1992 | Lawrence et al. |
| 5,156,661 A | 10/1992 | Adiletta |
| 5,186,825 A | 2/1993 | Drori |
| 5,221,479 A | 6/1993 | Etoh et al. |
| 5,232,595 A | 8/1993 | Meyer |
| 5,271,838 A | 12/1993 | Rahimi et al. |
| 5,283,106 A | 2/1994 | Seiler et al. |
| 5,284,184 A | 2/1994 | Noone et al. |
| 5,316,678 A | 5/1994 | Heaslip |
| 5,340,479 A | 8/1994 | Szczepanski et al. |
| 5,383,087 A | 1/1995 | Noone et al. |
| 5,389,256 A | 2/1995 | McEwen et al. |
| 5,429,745 A | 7/1995 | Ogata et al. |
| 5,433,859 A | 7/1995 | Degen |
| 5,435,916 A | 7/1995 | Schwartz |
| 5,469,892 A | 11/1995 | Noone et al. |
| 5,472,537 A | 12/1995 | Friel et al. |
| 5,537,136 A | 7/1996 | Brandon et al. |
| 5,586,997 A | 12/1996 | Pall et al. |
| 5,591,335 A | 1/1997 | Barboza et al. |
| 5,607,391 A | 3/1997 | Klinger et al. |
| 5,609,947 A | 3/1997 | Kamei et al. |
| 5,641,402 A | 6/1997 | Kohonen et al. |
| 5,716,522 A | 2/1998 | Chilton et al. |
| 5,720,790 A | 2/1998 | Kometani et al. |
| 5,736,042 A | 4/1998 | Aoki |
| 5,820,756 A | 10/1998 | McEwen et al. |
| 5,846,438 A | 12/1998 | Pall et al. |
| 5,902,480 A | 5/1999 | Chilton et al. |
| 5,958,236 A | 9/1999 | Bakula |
| 6,312,609 B1 | 11/2001 | Solyanik et al. |

OTHER PUBLICATIONS

Zeta Plus Generation 2 Cartridge System.
PolyPro XL.
International Search Report Dated Jul. 18, 2000 for PCT/US00/02682.
Seitz–Supradisc® with Seitz–Vela disc®, sales brochure, date unknown.
SWK–Vela®SWK–SIPRAdisk® May 1991, sales brochure, date unknown.

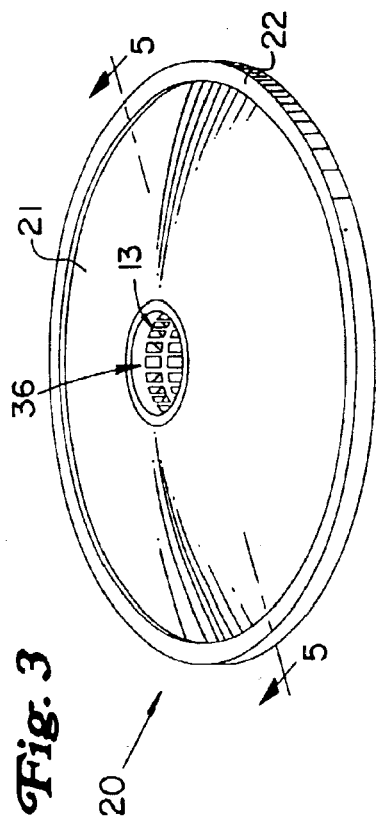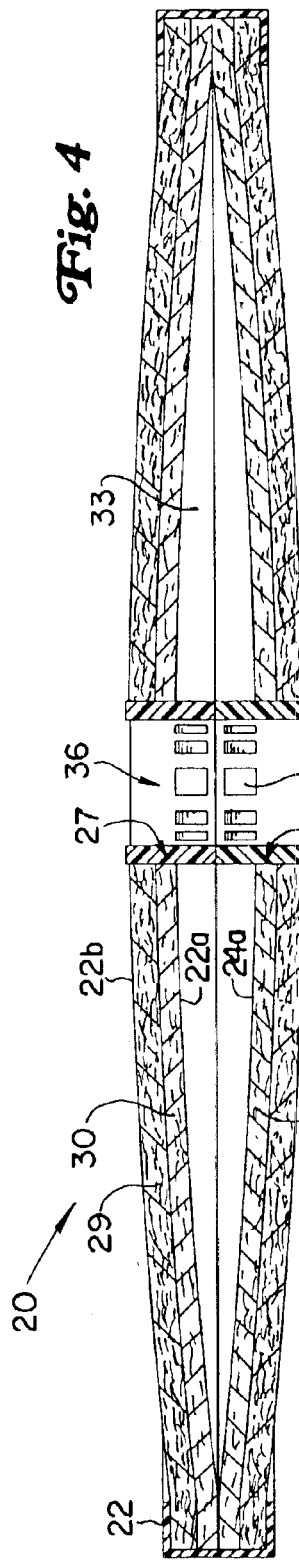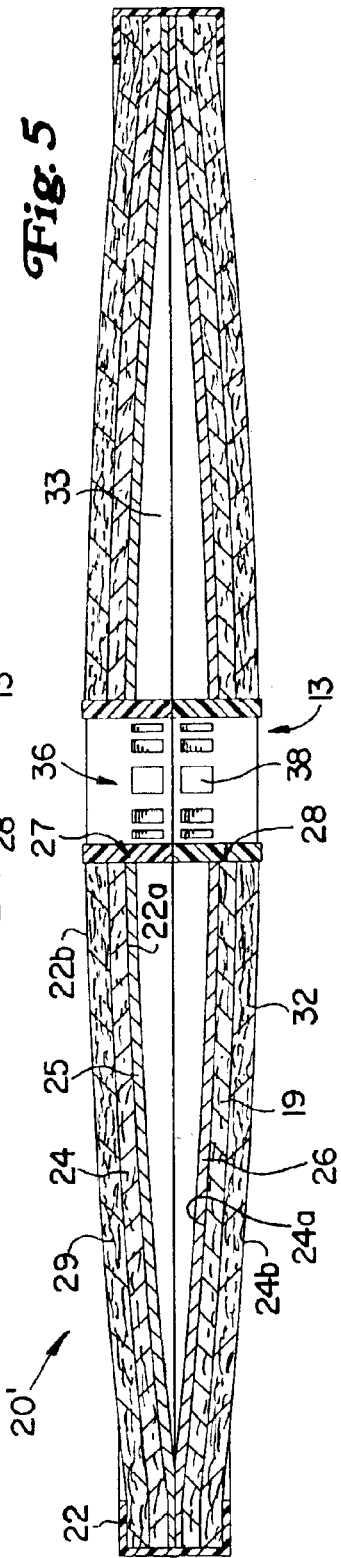

GRADED PARTICLE-SIZE RETENTION FILTER MEDIUM FOR FLUID FILTRATION UNIT WITH IMPROVED EDGE SEAL

RELATED APPLICATIONS

This application is a continuation-in-part of U.S. patent application Ser. No. 09/779,393, filed Feb. 8, 2001 of PULEK, entitled "EDGE SEAL FOR FILTER CARTRIDGE," now U.S. Pat. No. 6,464,084 issued Oct. 15, 2002, which is a continuation of U.S. patent application Ser. No. 09/135,489, filed Aug. 17, 1998, of PULEK, entitled "EDGE SEAL FOR FILTER CARTRIDGE," now abandoned and a continuation-in-part of U.S. patent application Ser. No. 09/498,251, filed Feb. 3, 2000, of PULEK et al., entitled "GRADED PARTICLE-SIZE RETENTION FILTER MEDIUM FOR CELL-TYPE FILTER UNIT," now U.S. Pat. No. 6,712,966, issued Mar. 30, 2004, which is based on and claims priority from U.S. Provisional Patent Application Ser. No. 60/118,603 filed Feb. 4, 1999, of PULEK et al., entitled "GRADED PARTICLE-SIZE RETENTION FILTER MEDIUM FOR CELL-TYPE FILTER UNIT," the disclosure of each is herein incorporated by reference to the extent not inconsistent with the present disclosure.

BACKGROUND OF THE DISCLOSURE

The present disclosure generally relates to a disk-shaped filter cartridge having filter medium having two or more filtration zones or layers of different particle-retention capability ("PRC") with respect to the fluid suspension which is filtered under ambient filtration conditions ("composite medium") wherein the zones or layers are positioned with respect to one another such that the contaminant-holding capacity ("CHC") per unit area of the composite medium is greater than the contaminant-holding capacity ("CHC") per unit area of the filtration zone or layer of the composite medium which has the greatest PRC when such is extrapolated to the depth of the composite medium and includes a new and innovative edge seal. More particularly, one representative embodiment of the present disclosure relates to a disk-shaped filtration unit employing such filter medium wherein the zones or layers are positioned with respect to one another such that medium layer most remote from the separator has a relatively larger PRC than a second medium contiguous therewith, any additional mediums positioned between the second medium and the separator have a pore size smaller than the most remote medium layer but which may be larger than the second medium layer, wherein the disk-shaped filter unit includes a new and innovative edge seal. Yet more particularly, another representative embodiment of the present disclosure relates to a disk-shaped filter unit having upper and lower composite medium separated by a separator layer wherein the zones or layers of each composite medium are positioned with respect to one another such that the CHC per unit area of the composite medium is greater than the CHC per unit area of the filtration zone or layer of the composite medium which has the greatest PRC when such is extrapolated to the depth of the composite medium wherein the operable upper and lower composite medium are operatively connected by an innovative edge seal. More specifically, yet another representative embodiment of the present disclosure relates to a disk-shaped filter unit having an upper composite medium and a lower composite medium separated by a non-filtering separator layer, wherein each of the filter medium is comprised of two or more zones or layers of filter material of the same or different composition and/or fabrication, each layer being positioned with respect to one another such that the more distal the zone or layer from the separator layer the lesser the PRC with respect to the fluid suspension which is to be filtered under attendant filtration conditions and the composite mediums are connected by an innovative edge seal. Still another representative embodiment of the present disclosure relates to a lenticular filtration unit having an upper composite medium and a lower composite medium, separated by a non-filtering separator layer, wherein each composite medium is fashioned to have a graded PRC in the direction of flow such that, as positioned on the non-filtering separator layer, the lenticular filtration unit is capable of more efficiently retaining smaller and smaller particles as the fluid moves from the surface of the filter medium towards the non-filtering separator layer and the composite mediums are operatively connected by an innovative edge seal wherein the innovative edge seal in combination with the upper and lower composite mediums provide a filtration unit having a very low tendency toward medium buckling resulting from the inclusion therein of a thermoplastic edge seal having certain desirable mechanical characteristics.

Disk-shaped filtration units are well known in the art, and have conventionally comprised two overlying similarly-shaped filter medium separated from one another along the majority of their opposing surface areas by a non-filtering separator element, and affixed to one another along their perimeter edges by an edge seal. Conventionally, the filter medium and the separator element each have a central void of about the same shape and dimension such that a uniform through bore in the filtration unit is formed when each void is aligned.

The separator element is conventionally composed of a material distinct from the composition of the medium which abuts the separator, and generally has openings therein of such size that the separator is substantially non-filtering with respect to the material to be filtered given its position within the cell-type filtration unit. In addition to separating the two filter medium, and supporting the filter medium under differential pressure, the separator element is generally fashioned to have a plurality of conduits formed therein, such conduits communicating with the central void of the separator and the through bore of the filtration unit to allow flow to get from the outer-diameter or edge of the disk-shaped filtration unit to a stacked common bore. Separators are conventionally fashioned from polymeric materials, in particular plastics, although they can also be fashioned from other materials, such as, for example, metals, ceramics and other material, as are in known in the art to be capable of separating the two layers effectively in a particular filter application environment.

A separator element may be manufactured to include upper and lower ribs of varying thickness to maintain the medium in a disk-shape. Lenticular filtration units, comprising two disk-shaped filter medium separated by a closed-curve non-filtering separator element, are particularly common place in the art. Separators used in lenticular filters generally have a plurality of ribs extending radially outward from a central aperture in a spoke-like fashion. An example of a lenticular cell-type filtration unit is found in U.S. Pat. No. 4,783,262 to Ostreicher et al., the disclosure of which is herein incorporated by reference to the extent not inconsistent with the present disclosure. However, any rib geometry may be used in the separator design to effectively maintain separation of the two disk-shaped filter medium and provide a flow channel from the outer diameter or edge of the disk-shaped filtration unit to the stacked common bore.

Generally, the outer circumference of the two medium discs of a lenticular filtration unit are held together by an insert molding process which encapsulates the circumferences in plastic. U.S. Pat. No. 4,347,208 to Southall, the disclosure of which is herein incorporated by reference to the extent not inconsistent with the present disclosure, discloses a method of making a filtration unit having a sealed periphery which includes the steps of placing two medium discs, and interposed separator, into a mold and injecting a thermoplastic polymer into the mold to form a seal around the two medium discs. The Southall patent discloses polypropylene, polyethylene, nylon, and polysulfone as the preferred thermoplastic polymers for molding the edge seal.

Lenticular filtration units use a variety of materials for filtering fluids, including without limitation, glass fibers, diatomaceous earth, perlite, cellulose, and binder resins. The filter medium is typically produced by a wet laid papermaking operation. Medium thickness generally ranges between about 0.130 to about 0.218 inches depending on the material formulation. By "filter medium," it is meant a porous article or mass having a porosity, or carrying/producing a charge, or incorporating matter which binds matter in the suspension, such that it will separate out matter in suspension in the fluid, gas or liquid, which is to be filtered.

Lenticular filtration units generally have a through bore and are generally employed in conventional practice by stacking one on another in seriatim to form a common bore, such common bore communicating with one or more separator conduits. The stacked filtration unit assembly, or filter cartridge, is then enclosed in a housing having an inlet port and an outlet port, the common bore typically being positioned in the housing so as to communicate with the outlet port. Not infrequently, fluid is supplied to the housing at high temperature and/or high pressure. The fluid enters the gaps between the adjacent filtration units and then passes through the filter medium covering the separator. As the fluid passes through the filter medium, undesirable materials such as aggregates and particulates are removed from the fluid. The filtered fluid then flows along the conduits of the separator to the common bore and exits the housing via the outlet port.

A significant advantage of stacked filter cartridges over other filtration systems is that the surface area of the filter material is quite large when compared to the total volume displaced by the stacked filter cartridge. This relatively large surface area permits larger volumes of fluid to be filtered, as compared to cartridges displacing a similar volume but which have a lower surface area, over the same period of time. Conventional stacked filter cartridges are useful in a variety of applications, including the filtration of fluids such as beverages, dielectric oils, chemicals, etc. Filter cartridges find use as both primary filters and pre-filters.

When used as pre-filters, stacked filter cartridges may be located upstream from another stacked filter cartridge, or from a filter cartridge of dissimilar construction, e.g. a pleated membrane filter. Owing to their large available surface area, disk-shaped filter cartridges are frequently used to remove particulates from a fluid stream prior to microfiltration by a membrane filtration unit. The pre-filter is designed to remove particulates which would otherwise plug the membrane of the membrane filtration unit, thereby preventing the reduction of both the filtration flow rate (or at constant flow, increasing the pressure differential through the membrane of the membrane filtration unit) and the reduction of the life of the membrane used by the membrane filtration unit.

While such dual filtration systems result in a highly purified effluent, the cost involved in maintaining both the pre-filter and qualifying filtration units is relatively high. Additional operational costs are incurred in using multiple filtration units in that additional housings which must be purchased and installed to incorporate each succeeding filtration unit. Further, there is a downtime cost with respect to the replacement of the filters of either filtration units, the filters of one filtration unit not infrequently being optimally replaced at a different time than the filters of other filtration unit.

While multi-layer cell-type filtration units are known in the art, additional layers serve purposes other than to increase CHC. For example, Cuno 05UW Zeta-Plus® is constructed of two identical cellulose and glass fiber layers (having the same pore size distribution and charge potential, as well as the same CHC per unit area and PRC) having a water absorbent layer of different materials located therebetween. The water absorbent layer is interposed to remove water from an oil filtrate and does not act as a particulate filtration medium. The cellulose layers act both as particle retention filters and as support for the relatively weak water absorbent layer as the water absorbent layer swells. A filter of similar construction is also produced commercially by Alsop®. Zeta-Plus® filters are also available having a layer of spunbond polypropylene or polyester non-woven placed between the separator and the cellulosic filter medium. The interposed layer does not act as a filter medium, but rather is used to support the filter medium, in particular under differential pressure. Zeta-Plus® filters having a layer of spunbond or netting placed on the outer surface of the filter medium are also known. Such outer layer is used to provide support in a reverse flow/pressure condition and helps insure that fluid flow is not obstructed between cells if the medium faces of two adjacent cells are in contact. Flowtech® also produces a similar commercial product. In neither case does the outer layer act as a filter medium.

A multi-layered construction is also found in the Roki Techno ABSO-AB® Series lenticular filters. In this product, two cellulosic filter medium layers are disposed on each side of the separator. One thin layer of melt-blown material, of about half the thickness of the overlying cellulosic filter medium, is located under the two-layer cellulosic filter medium, in contact with the separator—that is the melt-blown material is located between the separator and inner cellulose medium layer. The melt-blown material layer is used to reduce medium migration from the cellulosic filter medium to the separator. Such melt-blown material layer does not increase particle retention over the cellulosic filter medium. The melt-blown material layer, as measured by a Coulter Porometer, has a 12½ micron mean flow pore size versus 2–4 micron mean flow pore size for the cellulose filter medium.

Japanese Utility Model 5-2709 also discloses a multi-layer lenticular filtration unit but does not appear to describe the particle retention properties of the layers. No disclosure, teaching or suggestion is believed made by Japanese Utility Model 5-2709 that incorporates filter medium having two or more layers and/or zones of different PRC, with respect to the fluid suspension, which is filtered, under attendant ambient filtration conditions.

As mentioned above, in prior art filters of this type, the two medium discs are joined together by a thermoplastic edge seal, which grips the two medium layers to form a liquid tight seal at the outer periphery of the unit. As also mentioned above, U.S. Pat. No. 4,347,208 to Southall discloses a method of making a filtration unit having a sealed periphery which includes the steps of placing two medium discs and an interposed separator into a mold and injecting a thermoplastic polymer into the mold to form a seal around the two medium discs. The Southall patent discloses that polypropylene, polyethylene, nylon, and polysulfone are the preferred thermoplastic polymers for molding the edge seal, all of which have a relatively high elastic modulus.

It is known that thermoplastic edge seals formed by injection molding undergo radial shrinkage when cooled after solidification. This shrinkage apparently induces a compressive radial stress in the filter medium, thus increasing the tendency towards buckling the filter medium when the lenticular filter is in use, a condition wherein the filter medium layers deflect in a vertical plane. Furthermore, conventionally such thermoplastic edges are molded around a dry, solid, medium discs, resulting in a thermoplastic ring diameter larger than if thermoplastic material was molded and then allowed to cool unrestrained. Therefore, the restraint from typical shrinkage during molding induces molded-in stress in the thermoplastic edge seal, causing a distortion of the filter unit during initial heat sterilization/ sanitization cycles. The Southall patent recognizes that this is a characteristic of thermoplastic materials and discloses that the amount of polymer used during the injection molding process should be kept to a minimum to prevent excessive radial shrinkage of the edge seal and thereby decrease the tendency towards buckling.

It is well known in the art that the problem of lenticular filtration unit buckling is exacerbated during hot wash cycles in which lenticular filtration units are subjected to temperatures in excess of about 180° F. During hot wash cycles, as the filter assemblies are heated and the filter medium wet out, differential expansion coefficients between the thermoplastic components of the lenticular filtration unit and the lenticular filtration medium result in increased compressive stresses in the medium elements, further increasing the tendency towards buckling. During the period of time following a hot wash cycle, commonly referred to as the post flush period, the thermoplastic edge seal cools to room temperature and thus contracts radially inwardly while the cellulosic lenticular medium elements, still wet, remain swollen in an expanded state. Consequently, there is an interference generated and an increased tendency towards buckling due to the incompatibility of the edge seal material and the material of the filtration medium.

Thus, there is, therefore, a need for a more economical filtration system that results in decreased down time due to filter replacement and to provide for highly purified effluent without the need to resort to a dual filter filtration system. Further, it is desirable that the useful life of any qualifying filter used in a process be extended. Still further, it would be beneficial, therefore, to provide a lenticular filtration unit with a molded thermoplastic edge seal which does not impose excessive compressive forces on the lenticular filtration medium once cooled after injection molding, during hot wash cycles, or during post flush periods.

SUMMARY OF THE INVENTION

A representative disk-shaped filtration unit is disclosed having upper and lower filter medium operatively connected by an innovative edge seal, each of the filter medium comprising two or more filtration zones or layers of, presently preferably, different particle-retention capability ("PRC") with respect to the fluid suspension which is filtered under ambient filtration conditions ("composite medium") wherein the zones or layers, presently preferably, are positioned with respect to one another such that the contaminant-holding capacity ("CHC") per unit area of the composite medium is greater than the CHC per unit area of the filtration zone having the highest PRC on a basis weight (gm/sq-cm) comparison. More particularly, another representative embodiment of the present disclosure relates to a disk-shaped filtration unit having an upper and lower composite medium separated by a separator layer wherein the zones or layers of each composite medium is positioned with respect to one another such that the CHC per unit area of the composite medium is greater than the CHC per unit area of the filtration zone or layer of the composite medium which has the greatest PRC on a basis weight (gm/sq-cm) comparison and the upper and lower composite mediums are operatively connected by an innovative edge seal.

One representative embodiment of the present disclosure includes a fluid filtration unit comprising: an upper composite filter medium element; a lower composite filter medium element; a non-filtering separator element, operatively positioned between the upper composite filter medium element and the lower composite filter medium element; and structure operatively connecting the at least two filtration elements and the separator element together, the structure being formed from a material having a tensile modulus of elasticity of about 600 psi to about 35,000 psi at about 73° F. and of about 300 psi to about 10,000 psi at about 212° F., wherein the upper and lower composite filter medium elements comprise: at least two zones of filter material, at least one zone of the filter material comprising a fibrous material and filter aids, each of the at least two zones having a different PRC and being positioned such that at least one zone of each filter medium is disposed proximal to the separator element and at least one other zone of each filter medium is disposed distal to the separator element, the zone of filter medium disposed most proximal to the separator element having an increased relative-PRC than the zone of filter medium disposed most distal to the separator element.

Another embodiment of the present disclosure includes a fluid filtration unit comprising: an upper composite filter medium element; a lower composite filter medium element; a non-filtering separator element, operatively positioned between the upper composite filter medium element and the lower composite filter medium element; and sealing structure operatively connecting the at least two filtration elements and the separator element together, the structure being formed from a material having a tensile modulus of elasticity of about 600 psi to about 35,000 psi at about 73° F. and of about 300 psi to about 10,000 psi at about 212° F., wherein the upper and lower composite filter medium elements comprise: at least two zones of filter material, at least one zone of the filter material comprising a fibrous material and filter aids, each of the at least two zones having a different PRC and being positioned such that at least one zone of each filter medium is disposed proximal to the separator element and at least one other zone of each filter medium is disposed distal to the separator element, the zone of filter medium disposed most proximal to the separator element being capable of removing particles of given size more efficiently than the zone of filter medium disposed most distal to the separator element.

And yet another aspect of the present disclosure includes a fluid filtration unit comprising: at least one upper composite filter medium element; at least one lower composite filter medium element; at least one non-filtering separator element operatively positioned between the at least one upper composite filter medium element and the at least one lower composite filter medium element, each of the at least one upper and the at least one lower composite filter medium elements further comprising: at least two zones of filter material, at least one zone of the filter material comprising a fibrous material and filter aids, each zone having a different PRC, such that at least one zone of each medium is disposed proximal to the separator element and at least one other zone of each medium is disposed distal to the separator element, the zone disposed most proximal to the separator element having a greater standardized-PRC than the zone disposed most distal to the separator element; and structure operatively connecting the at least two filtration elements and the separator element together, the structure being formed from a material having a tensile modulus of elasticity of about 4700 psi to about 19,000 psi at about 73° F. and of about 1300 psi to about 2,000 psi at about 212° F. and a hardness of about 80 shore A to about 40 shore D.

A further embodiment disclosed is a disk-shaped filter cartridge comprising: a fluid filtration unit comprising: at least one upper composite filter medium element; at least one lower composite filter medium element; at least one non-filtering separator element operatively positioned between the at least one upper composite filter medium element and the at least one lower composite filter medium element, each of the at least one upper and the at least one lower composite filter medium elements further comprise: at least two zones of filter material, at least one zone of the filter material comprising a fibrous material and filter aids, each zone having a different PRC, such that at least one zone of each medium is disposed proximal to the separator element and at least one other zone of each medium is disposed distal to the separator element, each succeeding zone towards the separator element from the zone disposed most distal from the separator element has an increased relative-PRC; and structure operatively connecting the at least two filtration elements and the separator element together, the structure being formed from a material having a tensile modulus of elasticity of about 4700 psi to about 19,000 psi at about 73° F. and of about 1300 psi to about 2,000 psi at about 212° F. and a hardness of about 80 shore A to about 40 shore D.

Still another aspect of the present disclosure includes a fluid filtration unit comprising: at least one upper composite filter medium element: at least one lower composite filter medium element; at least one non-filtering separator element operatively positioned between the at least one upper composite filter medium element and the at least one lower composite filter medium element, each of the at least one upper and the at least one lower composite filter medium elements further comprise: at least two zones of filter material, at least one zone of the filter material comprising a fibrous material and filter aids, each zone having a different PRC, such that at least one zone of each medium is disposed proximal to the separator element and at least one other zone of each medium is disposed distal to the separator element, each succeeding zone towards the separator element from the zone disposed most distal from the separator element has an greater standardized-PRC; and structure operatively connecting the at least two filtration elements and the separator element together, the structure being formed from a material having a tensile modulus of elasticity of about 4700 psi to about 19,000 psi at about 73° F. and of about 1300 psi to about 2,000 psi at about 212° F. and a hardness of about 80 shore A to about 40 shore D.

Objects and advantages of the disclosure will be apparent from the following description, the accompanying drawings and the appended claims.

BRIEF DESCRIPTION OF THE DRAWINGS

FIG. 3 is a side perspective elevational view of a representative embodiment of a disk-shaped filtration unit of the present disclosure;

FIG. 4 is a cross-section view of the representative disk-shaped filtration unit of FIG. 3, cut along the 5–5' line, having two filter medium layers of equal thickness but different construction;

FIG. 5 is a cross-section view of the representative disk-shaped filtration unit of FIG. 3, cut along the 5–5' line, having a filter medium layer, a thin filtration membrane layer, and a thin support layer;

DETAILED DESCRIPTION OF THE DISCLOSURE

Figure 1:
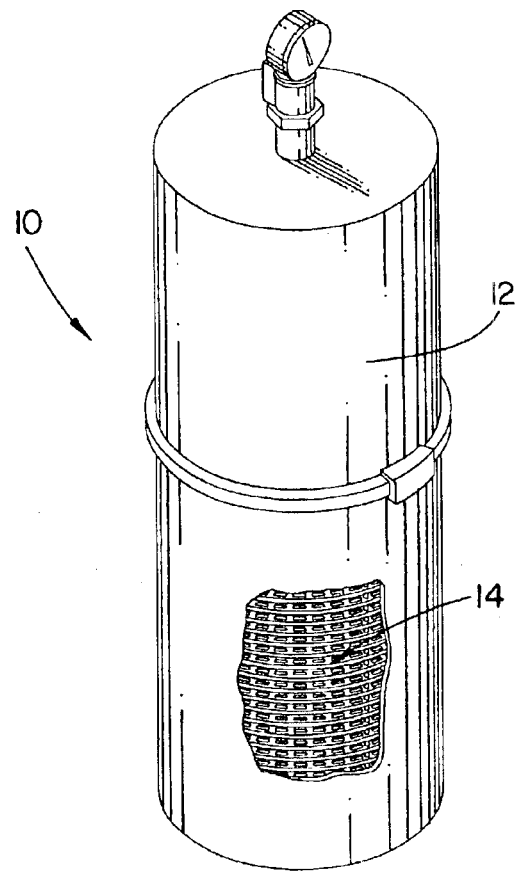
FIG. 1 is a perspective view of a representative fluid filtration apparatus having a two-part cylindrical housing with a portion of the side wall of cylindrical housing broken away to show a plurality of axially aligned lenticular filtration units disposed therein.

A representative disk-shaped filtration unit having one or more filter medium installed on each side of a separator element, the separator element being of such composition as to have minimal, if any, filtering capability for the fluid to be filtered at its position in the unit, but being sufficient to effectively separate the filter medium on each side thereof, and each filter medium comprising two or more zones or layers of filter material which differ in their ability to retain different-sized particles and/or total contaminant mass given ambient filtration conditions, the filter medium and separator being operatively connected by an innovative end seal is disclosed. The two or more zones or layers may comprise one or more sheets of filter medium, which may be composed of similar materials (in which the materials are formulated and processed to create a medium with different retention capabilities), or may be composed of different materials having distinctly different particle retention characteristics. The two or more zones or layers may be contiguous or non-contiguous with one another as long as the fluid being filtered communicates between the zones or layers.

Particle retention by a filter medium may result, for example, from mechanical (e.g., pore size), chemical (e.g., covalent, hydrophilic bonding) or electro-kinetic interactions (e.g. anionic, cationic binding) between the suspended material which is to be removed and the filter medium.

Particle-retention capability ("PRC") is a measure of the competence of filter medium to retain a diverse size range of particles. When two filter medium are indicated to have "different PRCs", it is meant that there is a measurable difference in either the relative-PRC or standardized-PRC.

By increased "relative-PRC" of a first filter medium over a second filter medium, it is meant, that given the suspension being filtered, at ambient filtration conditions (pressure, temperature etc.), that the first filter medium is capable of removing particles of smaller size, and/or removing a given particle size more efficiently, than the second filter medium before a significant pressure drop across the medium occurs. As the PRC of a filter medium zone or layer may be affected by numerous parameters depending on the extreme of conditions and the method(s) of particle retention, for example, the pH of the fluid being filtered, the charge on the particles being filtered, the charge on the filter medium, the fluid pressure at which the fluid is filtered, the temperature of the filtered suspension, and the characteristics of the fluid in which the particles are suspended (e.g., bonding affinity between the fluid and the particles), a standardized-PRC measurement has been developed to characterize the ability of filter medium to retain a diverse size range of particles with respect to commonly filtered suspensions under commonly encountered filtration conditions.

By "standardized-PRC" it is meant the smallest particle size that a given basis weight (gm/sq-cm) of substantially uniformly-fabricated filter medium is able to consistently retain, before a significant pressure drop across the medium occurs, when the filter medium is challenged with 0.2 um–1.0 um diameter spherically-shaped mono-dispersed latex beads (of anionic charge if the filter medium is predominantly positively charge, of cationic charge if the filter medium is predominantly negatively charged, and of neutral charged if the filter medium is predominantly neutrally charged, using serial testing at 0.1 um diameter intervals) suspended in a solution of doubly-distilled water (adjusted to pH 4.0 if the latex beads are anionically-charged, to pH 8.0 if the latex beads are cationically-charged, and to pH 7.0 if the latex beads are neutrally-charged) when such latex beads are suspended at a concentration of 1 mg/deciliter and when such suspension is filtered at STP. When a first filter medium is the to have a "different" standardized-PRC or relative-PRC than a second filter medium, it is meant that the relevant measurement differs by more than about 10%, and more preferably by more than about 25%, and yet more preferably more than about 50%. "Contaminant holding capacity" is a measure of the ability of a unit area of filter medium to retain contaminants. When two medium are indicated to have "different CHCs" it is meant that there is a measurable difference in either the relative-CHC or standardized-CHC.

By increased "relative-CHC" of a first filter medium over a second filter medium, it is meant, that for the suspension being filtered, at ambient filtration conditions (pressure, temperature etc.,), that for given a unit area of projected filter medium (that is, projected along its thickness), the first filter medium is capable of retaining more of the particles suspended in the filtered suspension per unit area as opposed to the second filter medium, that is, before a substantial pressure drop across either filter medium occurs. As with PRC, due to the number of variables that may affect CHC of a filter medium, including for example, the pH of the fluid being filtered, the charge on the particles being filtered, the charge on the filter medium, the fluid pressure at which the fluid is filtered, the temperature of filtered suspension, and the characteristics of the fluid in which the particles are suspended (e.g., bonding affinity between the fluid and the particles), a standardized-CHC per unit area measurement has been established to characterize the capacity of a projected unit area of most filter medium to retain contaminants given exposure to most commonly filtered suspensions and under common filtration conditions.

By "standardized-CHC" it is meant the capacity (weight) of a projected area of filter medium, before a significant pressure drop across the medium occurs, to retain a uniformly distributed diverse size-range of spherically-shaped mono-dispersed latex beads (of anionic charge if the filter medium is predominantly positively charged, of cationic charge if the filter medium is predominantly negatively charged, and of neutral charge if the filter medium is predominantly neutrally charged) having diameters of 0.2 um–1.0 um, at 0.1 um diameter intervals, when such beads are suspended in a solution of doubly-distilled water (adjusted to pH 4.0 if the latex beads are anionically-charged, to pH 8.0 if the latex beads are cationically-charged, and to pH 7.0 if the latex beads are neutrally-charged) when such latex beads are at a concentration of 1 mg/deciliter and when such suspension is filtered at STP. When a first filter medium is the to have a "different" standardized-CHC or relative-CHC per unit area than a second filter medium, it is meant that the relevant measurement differs by more than about 10%, and more preferably by more than about 25%, and yet more preferably by more than about 50%, than the second filter medium.

Filter medium having different PRC may be produced discretely by standard manufacturing methods. Such medium may then be physically stacked onto each other to create finished multi-layer medium structure within a cell. Alternatively, the multi-zone medium structure may be produced by forming a first medium zone of a certain PRC by standard manufacturing methods, and then overfelting this first medium zone with other medium zones of different PRC. Such alternative methodology yields a single contiguous sheet of medium, which contains multiple filtration zones. This sheet can be assembled into a cell in the selected orientation.

In a presently preferred representative embodiment, a first filter medium zone capable of retaining the smallest particle sizes, as compared to other filter medium zone, is located adjacent to the separator (downstream side) to act as the qualifying zone which determines particle removal efficiency. Each succeeding filter medium zone installed distal to the first filter medium (i.e., upstream) is less capable of removing smaller-sized particles than the filter medium more proximal to the separator. That is, presently preferably the PRC of the filter medium zones increase in the direction of fluid flow so that contaminants that are desired to be removed are progressively retained throughout the filter medium thickness as a function of the filtered particle size and proximity from the separator. Presently preferably the zones or layers on one side of the separator are substantially the same in construct (fabrication, composition, dimension and charge) and positioned in the same manner with respect to the separator.

In filtration units having two or more filter medium elements of graded PRC, presently preferably the gradation is such that the PRC increases from upstream (from the filtering surface of the filter medium) to downstream (adjacent to the separator). An advantage of such gradation, is that the CHC of the combined layers is greater than the CHC of either layer alone, even when such layers individually are taken to the same depth of the combined layers.

However, it should be understood that after the first two filter medium zones, the first zone being the most distal from the separator and the second zone being more proximal the separator, additional zones of filter medium between the separator and the second zone may have a capability of removing smaller-sized particles than the filter mediums more distal to the separator but may alternatively have less capability of removing smaller-sized particles than the second zone but the capability of removing smaller-sized particles than the first zone or the zone most distal from the separator.

The PRC of the filter medium may be varied by altering the composition, which makes up the medium, and/or fabrication of the medium. For example, Zeta-Plus® filter medium is made from a combination of fiber, filter aids and resin. Fibers, such as cellulose, glass or synthetic fibers, may be selected to alter the PRC. PRC may also be affected by the particular filter aid chosen, such as one of the variety of grades of Diatomaceous Earth (DE) or Perlite. Likewise, variation of the resin that is incorporated to act as a binder may also effect PRC due to the electrokinetic properties imparted by the resin to the medium. PRC of materials of the same general composition may be altered by varying the ratio of the components, for example, the amount of cellulose used. PRC may also be modified by changes in the process used in making or fabricating the filter medium, as, for example, in adding a calendering operation to densify the medium.

As stated above, the filter medium may be comprised of one or more zones made from dissimilar material. One zone, for example, could be of a Zeta-Plus® construct, while the other zone may be a medium typically used in a pleated filter, such as a melt-blown material, a membrane, etc. Typically, the thickness of such zones will need to be adjusted such that they can be made into a cell unit using conventional machinery, however, this is not required if machinery is modified to accommodate a thicker composite medium. Each medium filtration zone may be produced discretely by its own standard manufacturing methods and then physically stacked onto the other medium filtration layers to create a finished multi-layer structure within the cell unit. It is presently preferred that the medium layer having the highest PRC be located as the downstream zone. When Zeta-Plus® medium is used as the upstream filtration zone, the downstream zone may advantageously be a calendared melt-blown polypropylene medium of the type used in the Polypro XL® pleated filter, or a symmetric cast nylon membrane of the type used in Cuno's Zetapor® or BevAssure® pleated filter. An asymmetric cast nylon membrane of the type used in Cuno's LifeAssure™ pleated filter may also be used. When the Zeta-Plus® medium is used as the downstream filtration zone, the upstream zone may advantageously include an un-calendared melt-blown polypropylene medium of the type used in the more open retention ratings of the Polypro XL® pleated filter.

The filter medium may alternatively be comprised of one or more zones made from a material of substantially the same construct (formulation and fabrication) and charge (i.e., having substantially the same zeta-potential). In such case, the PRC of each zone is directly correlateable with the airflow resistance across the medium zone (i.e., the higher the airflow resistance, the greater the PRC). Presently preferably the zone oriented most-upstream (in a fluid flow) will have a smaller air flow resistance (and therefore the pressure) and therefore lower PRC, than the each succeeding downstream zone. Presently preferably, the difference in air flow resistance between each succeeding zone differs by more than about 10%, preferably more than about 25%, and yet more preferably more than about 50%, but not more than about 80%. However, it should be understood that while the 80% upper limitation is believed to be all that may be required, it is not an absolute upper limit and the differences in air flow resistance between each succeeding zone may differ by more than 80%, as may be required by any specific applications, as experimentally determined.

The filter medium zone most proximal to the separator element may be separated from the separator by an intervening support material for supporting such filter medium zone and preventing intrusion of the any portion of the filter medium zone under pressure differential into any conduit, groove or indentation in the separator. Support zones may also be interposed between filter medium zones.

Although standard medium thickness may be utilized for each filter medium zone in the multi-zone filter medium disk-shaped filter, it is presently preferred that the total filter medium thickness in the multi-zone filter unit be about 0.130 to 0.218 inches. Such total filter medium thickness is presently preferred as the increase in total filter medium thickness per unit may cause a significant reduction in the number of units and ultimately reduce the associated filter surface area in a defined cartridge housing.

The thickness of each zone in a multi-zone filter medium may differ. In order to require minimum modifications to presently employed cell-type filtration unit assembly equipment and molds, it may be preferred to limit additional zones to a filter medium zone of standard thickness (between about 0.10 to about 0.25 inches) to membrane-like thickness, and in particular to less than about 30 mils. Any thin membrane that increases particle removal efficiency performance versus the overlying filter medium layer may be used in conjunction with a filter medium of standard thickness. Presently preferred are zones comprising melt-blown medium, particularly polypropylene material (e.g., Polypro®XL) and cast nylon microporous membrane (e.g., Zetapor®, LifeAssure™).

The separator presently preferably should support the filter medium under differential pressure while providing flow conduits for the clean fluid to exit the cell.

Filtration units of the present disclosure may be stacked in a conventional manner to form a cartridge. Disk-shaped filtration units are presently preferably stacked along a central axis. Typically, the number of units making up such a cartridge are known to vary between 2–21 units, commonly about 16 units.

While a membrane filter medium zone may contact directly onto each side of the separator, a support material zone may be interposed between any such zone and the separator to add protection against abrasion, collapse, etc. The support material zone should presently preferably be relatively stiff and strong, but have a relatively open pore size such that it does not contribute significantly to change in pressure, or act as a filter medium. Presently preferred materials include spun bound non-woven material (e.g., Typar®, Reemay®) or a plastic netting (e.g., AET Plastinet®, Conwed Vexar®). Presently preferably, the support material and the filter medium zones are sealed together in their outer perimeters, presently preferably, by an injection molded polymeric edge seal, or by other process and materials, that provide support to perform the sealing function.

Presently preferably the filter medium, separator, and any support material are centered about a central void of the same size and dimension. In a lenticular filter, such void is generally circular. Presently it is preferred that the filter mediums are bounded along their perimeters by an insert molding process that encapsulates the perimeters in plastic. Sealing along the central void perimeter may be provided by axial compressive forces generated during cartridge-housing installation for double-open end ("DOE") style cartridges, or by assembly force for single open end ("SOE") cartridge, or by other methods presently known in the art.

The present disclosure is directed to a lenticular filtration unit of the type described above and being joined at the outer peripheries thereof by a new and innovative thermoplastic edge seal, presently preferably, applied to the filtration unit during an injection molding process. The representative filter medium elements are, presently preferably, formed from a cellulosic material and the representative spacer element is presently preferred formed from a thermoplastic material, which serves to maintain the structural integrity of the filtration unit.

In accordance with the present disclosure, the thermoplastic material from which the edge seal is formed during the injection molding process has a, presently preferably, relatively low modulus of elasticity, as compared to other thermoplastic materials, such as, for example, polypropylene, polysulfone and nylon. Therefore, the filtration unit having an edge seal incorporated therein is significantly less prone to medium buckling than prior art cell-type filtration assemblies having an edge seal formulated from prior art materials, as a consequence of stresses induced by the injection molding process, or those which are induced during a hot flush period in which the cell medium and edge seal expand due to liquid absorption and elevated temperatures, or those which are induced during a post flush period in which the edge seal tends to contract as it cools while the filter medium remains in an expanded state due to fluid absorption.

Referring now to the drawings, wherein like reference numerals identify similar structural elements of the present disclosure, and which set forth representative embodiments of the present disclosure, additional advantages of the present disclosure become readily apparent.

FIG. 1 illustrates a representative fluid filtration apparatus constructed in accordance with a presently preferred representative embodiment of the present disclosure and designated generally by reference numeral 10. As illustrated, filtration system 10 includes a representative cylindrical housing 12 which houses a representative filtration assembly 14 having a plurality of axially stacked fluid filtration units.

Figure 2:
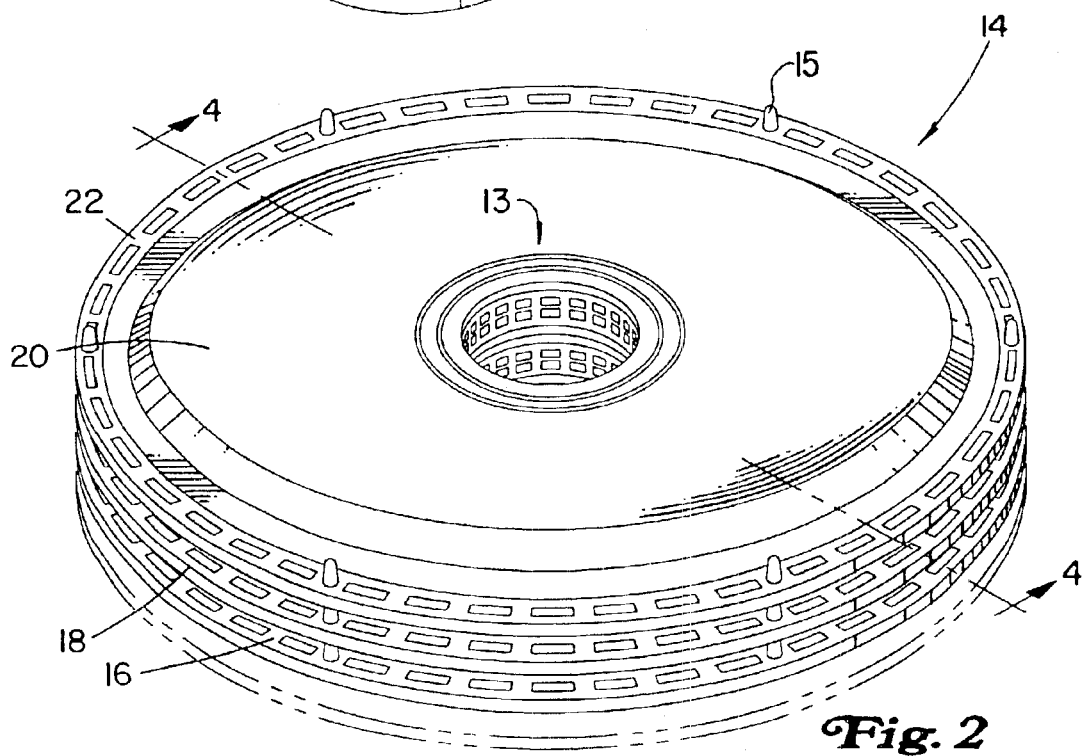
FIG. 2 is a perspective view of a plurality of axially aligned lenticular filtration units constructed in accordance with a representative embodiment of the present disclosure.

Referring to FIG. 2, there is illustrated a portion of filtration assembly 14 which includes, among other elements represented, axially stacked filtration units 16, 18, and 20. Optionally, in one possible representative embodiment operatively found on edge seal 22, are a plurality of circumferentially spaced apart tabs 15 which project axially from the upper surface of the edge seal 22 of each filtration unit 16, 18, and 20 for maintaining the axial spacing therebetween. Tabs 15 are presently preferably formed monolithic with the edge seal 22 during the injection molding process. The specific injection mold used to form the edge seal 22 may include provisions for such tab 15 structures.

As best seen in FIG. 4, each of the filtration units 16, 18, and 20 of assembly 14 includes an upper filter medium element 27 having an inner surface 22a and an outer surface 22b, and a lower filter medium element 28 having an inner surface 24a and an outer surface 24b. A separator element 33 is operatively positioned between the inner surface 22a of the upper filter medium element 27, and inner surface 24a of the lower filter medium element 28 to maintain the structural integrity or stiffness of filtration units 16, 18, and 20. The separator 33 is presently preferably formed from polypropylene, and conventionally includes a plurality of ribs (not shown) which extend between a radially outer rim and a radially inner hub 36, as disclosed, for example, in U.S. Pat. No. 4,783,262 to Ostreicher et al., the disclosure of which is herein incorporated by reference to the extent not inconsistent with the present disclosure. The inner hub 36 of separator 33 includes a plurality of apertures 38 to facilitate the flow of filtered fluid into the axial core 13 of each of the filtration units 16, 18, and 20 of filtration assembly 14.

Referring to FIG. 3, there is shown a side perspective elevational view of a representative filtration unit 20, having a relatively large upper filter medium filtration area 21, an outer edge seal 22 disposed along the circumference of the filtration unit 20 to retain the various components of the filtration unit, and inner hub 36.

Referring again to FIG. 4, wherein filtration unit 20 is a representative of filtration units 16, 18, and 20, filtration unit 20 includes an upper filter medium element 27 composed of a first upper filter medium layer 29 and a second upper filter medium layer 30. In a similar manner, lower filter medium element 28 is composed of a first lower filter medium layer 32 and a second lower filter medium layer 31. As illustrated, first upper filter medium layer 29 and second upper filter medium layer 30, as well as first lower filter medium layer 32 and second lower filter medium layer 31, may be generally of the same thickness. The first, 29, 32 and second 30, 31 filter medium layers of the present disclosure are manufactured to have different PRCs. Upper filter medium element 27 and lower filter medium element 28 may be circular in shape and joined by the circular edge seal 22 which grips the upper filter medium element 27 and lower filter medium element 28 on either side to form a liquid tight seal at the circumference of the filtration unit 20.

Now referring to FIG. 5, there is shown a cross-section of another representative filtration unit 20' taken along the 5–5' line of FIG. 3, wherein the filtration unit 20' includes an upper 25 and lower 26 support layer interior to second upper filter medium layer 24 and second lower filter medium layer 19, which in turn is interior to first upper filter medium layer 29 and first lower filter medium layer 32. First upper filter medium layer 29 and first lower filter medium layer 32 are manufactured to have a different PRC than second upper filter medium layer 24 and second lower filter medium layer 19. Upper 25 and lower 26 support layers may provide, respectively, support to second upper filter medium layer 24 and second lower filter medium layer 19.

Figure 6:
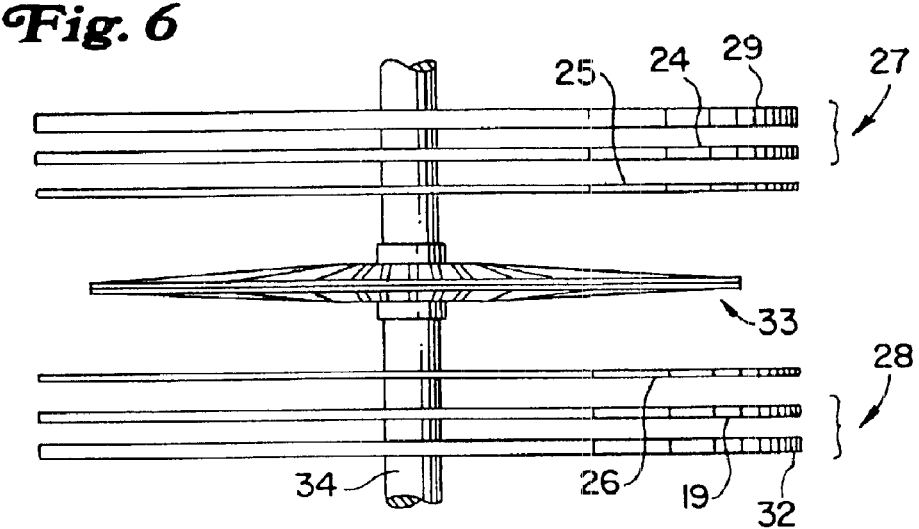
FIG. 6 is a side elevational view showing assembly of the individual components of a representative disk-shaped filtration unit embodiment of FIG. 5.

Now referring to FIG. 6, there is shown a side elevational representation illustrating the assembly process for the individual components of the filtration unit of FIG. 3 using a representative unit assembly mandrel 34. During the representative process, separator 33 is initially placed on mandrel 34. On either side of separator 33, upper 25 and lower 26 support layers are placed, followed by second upper filter medium layer 24 and second lower filter medium layer 19, respectively. Such filter medium layers are capable of retaining relatively smaller-sized particles than first upper filter medium layer 29 and first lower filter medium layer 32 which follow thereafter. In one embodiment (not shown), filter medium layers 29 and 32 are relatively large pore size filter mediums, and are further covered by a filter netting to aid in holding the filter medium together.

Figure 7:
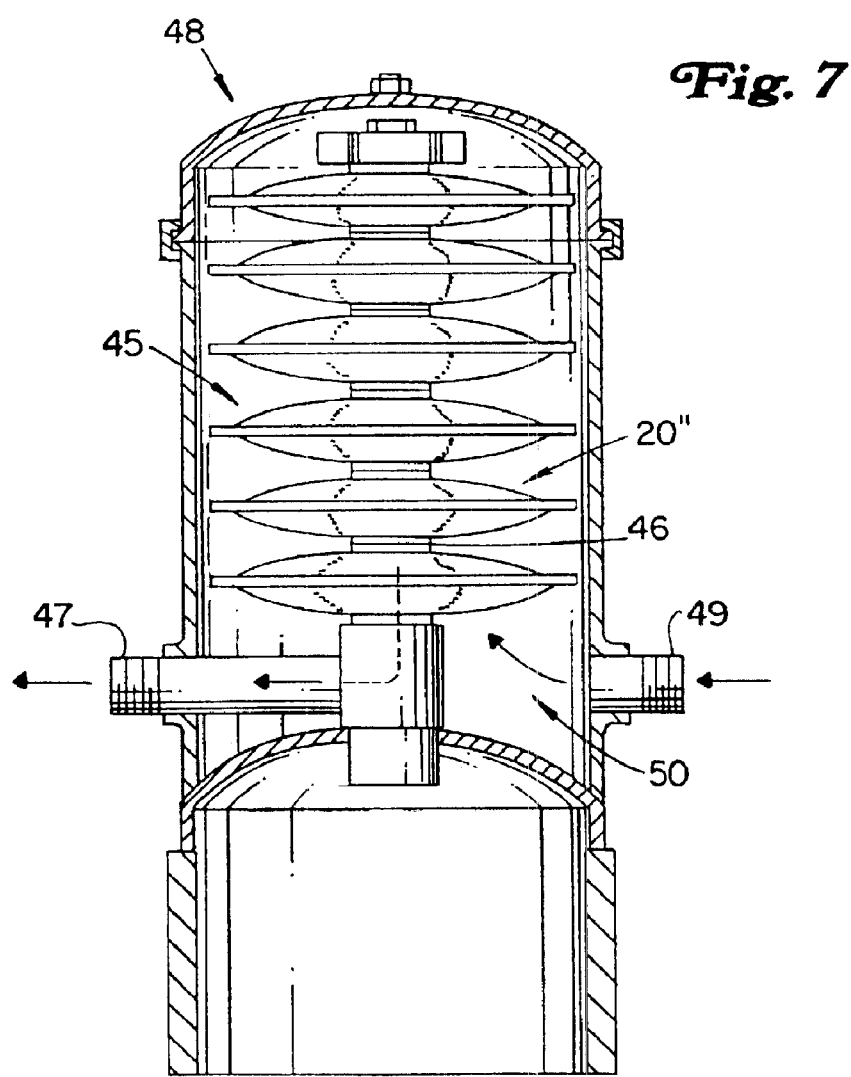
FIG. 7 is a perspective cross-sectional view of a representative lenticular filtration unit assembly having disk-shaped filtration units of the present disclosure.

Turning now to FIG. 7, there is shown a perspective view of a representative filtration unit assembly 45 comprising a plurality of filtration units 20" of the present disclosure positioned in filter housing 48. Filtration unit assembly 45 is comprised of a series of axially stacked filtration units 20" positioned about a central axis 46 communicating with out-take pipe 47 of filtration housing 48. In operation, the fluid to be filtered is passed through inlet pipe 49 into housing interior 50. The fluid passes through the filter medium of filtration units 20" and is conducted through the plurality of apertures 38 in separator 33 (See FIGS. 4 and 5) to the axial core 13 and central axis 46 and out of out-take pipe 47.

Figure 8:
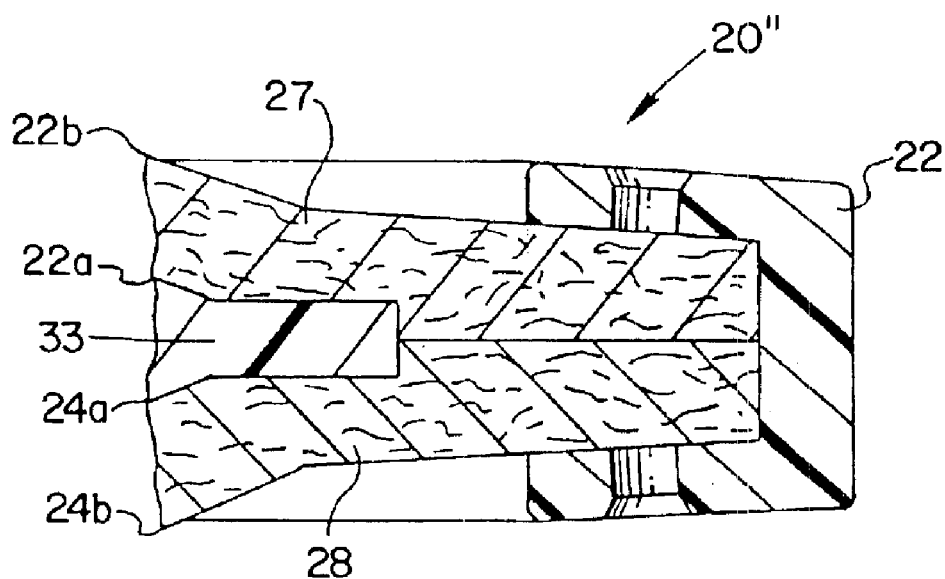
FIG. 8 is an enlarged localized view of the radially outer portion of the lenticular filtration unit illustrated in FIG. 4, in cross-section, with the medium elements of the filtration unit shown in a dry or contracted state.
Figure 9:
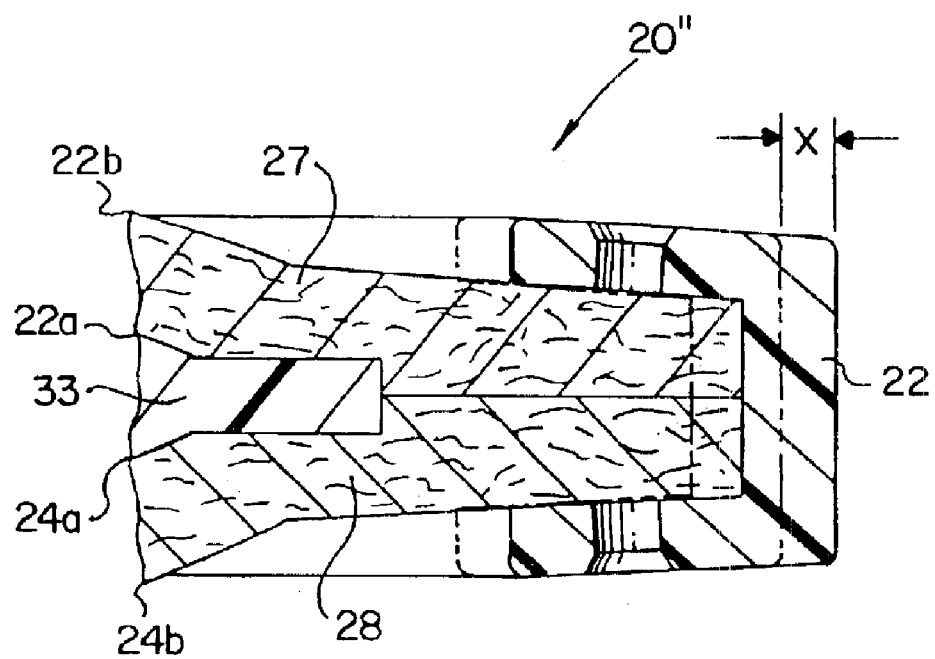
FIG. 9 is an enlarged localized view of the radially outer portion of the lenticular filtration unit illustrated in FIG. 4, in cross-section, with the medium elements of the filtration unit shown in a wet or expanded state and the filtration unit in a radially expanded condition.

As shown in FIGS. 8 and 9, each filtration unit 20″ is constructed during a manufacturing procedure which includes the operative placement of the upper and lower filter medium elements 27 and 28, and separator 33 into a mold, and subsequently injecting a thermoplastic material having ultimately desirable mechanical characteristics into the mold to form an edge seal 22 about the outer periphery of the filter medium elements 27 and 28. During the injection molding process, compressive forces are exerted upon the outer surfaces 22b and 24b of filter medium elements 27 and 28 of filtration unit 20″ to maintain contact at their inner surfaces 22a and 24a. (See FIG. 8)

It is well known that the injection molding process employed in the fabrication of filtration units induces fabrication stresses in the filter medium elements 27 and 28, as well as in the thermoplastic edge seal 22 as the edge seal 22 cools to room temperature following the injection molding process. It is also well known that post fabrication stresses in the edge seal of a filtration unit tends to cause the filter medium elements 27 and 28 to buckle in a vertical plane when used in filtration operations, particularly during hot flush cycles in which heated water is forced through the fluid filtration system 10 to sanitize the fluid filtration system, causing the filter medium elements 27 and 28 to swell in size due to fluid absorption. It is also well known that stresses are imparted upon the filter medium elements by the edge seal 22 during the post flush period during which the filtration unit, including the edge seal, cools to room temperature, while the filter medium layers remain in an expanded state due to fluid absorption.

In a filtration unit constructed with an edge seal formed from a thermoplastic material having a relatively high elastic modulus, i.e., a material which does not comply to forces exerted by the filter medium when in an expanded state due to fluid absorption, such as, for example, polypropylene, it has been recognized that there is a significant tendency toward medium layer/element buckling.

In one presently preferred representative embodiment of one presently preferred combination lenticular filtration units and improved edge seal of the present disclosure, the filtration medium elements have a first set of dimensional characteristics in a dry state and a second set of dimensional characteristics in a wet state, and the edge seal is formed from a thermoplastic material which expands and contracts in response to changes in the dimensional characteristics of the medium elements.

In another presently preferred representative embodiment of the present disclosure, the filtration medium elements are formed from a material which swells in size due to fluid absorption, and the edge seal is formed from a thermoplastic material having a modulus of elasticity which is sufficient to permit corresponding radial expansion of the edge seal when the filtration unit medium swells in size and corresponding contraction if the filtration unit shrinks upon drying.

In still another presently preferred representative embodiment of the present disclosure in which the medium elements are formed from a material which swells in size due to fluid absorption, the edge seal is formed from a thermoplastic material having a modulus of elasticity which is sufficiently low to enable the edge seal to comply with the forces exerted thereupon by the medium elements as the medium elements swell in size.

Presently preferably, the thermoplastic material for which the edge seal of the present disclosure is formed is a polypropylene and EPDM blend, such as, for example Santoprene® thermoplastic rubber. Presently preferably the polypropylene/EPDM blend has a hardness of about 50 shore A to about 60 shore D, more preferably of about 70 shore A to about 50 shore D, and yet more preferably about 80 shore A to about 40 shore D. Presently preferably the tensile modulus of elasticity of the blend at about 73° F. is about 600 psi to about 35,000 psi, more preferably about 2300 psi to about 27,000 psi, and yet more preferably about 4700 psi to about 19,000 psi. The presently preferred tensile modulus of elasticity of the blend at about 212° F. is about 300 psi to about 10,000 psi, more preferably about 800 psi to about 5,000 psi and more preferably about 1300 psi to about 2,000 psi. The presently preferred modulus of elasticity of the blend at about 250° F. is about 200 psi to about 5,000 psi, more preferably about 300 psi to about 3,000 psi, and yet more preferably about 400 psi to about 1000 psi. For example, Santoprene® grade 271–87, which has found to be particularly useful, has the following characteristics: a hardness of about 87 Shore A; a modulus of elasticity of about 16,400 psi at approximately 73® F.; a modulus of elasticity of about of about 1340 psi at approximately 212° F.; a modulus of elasticity of about 790 psi at approximately 257° F.; and a solidification temperature of approximately 208° F. Other forms of Santoprene® thermoplastic rubber, with similar mechanical characteristics may also suffice in the present disclosure.

As would be readily apparent to one of ordinary skill in the art from the present disclosure, the multi-zone disk-shaped filtration unit of the present disclosure provides for significant advantages over filtration units of the prior art. By incorporating additional filtration medium zones having larger PRCs and/or CHCs into a conventional filtration unit in the manner described, particle removal efficiency and retention performance of the stacked filtration assembly is significantly improved without affecting the life of the filtration unit. Another major benefit for the filter customer is improved filtration economics. As previously noted, in many filtering process applications, stacked cell-type filtration unit cartridges are used as a pre-filter to a downstream membrane filter. By incorporating the membrane medium into the pre-filter assembly in the manner described, the downstream membrane filter and its housing may be eliminated or its useful life significantly lengthened (if it can't be removed from service due to integrity test requirements). Further, less down time would be anticipated to be spent in checking and replacing one filter rather than in checking and replacing two filters. One also gets, for a wide variety of filter medium, the benefits of longer life with the same PRC versus that of single layer medium.

FILTRATION EXAMPLES

The examples which follow are representative of a few of the many scenarios in which such filter construct might find advantageous use.

Example 1

A customer is currently using a ZetaPlus® grade 60S product. The customer asserts that the product provides acceptable in-line life, but only marginally meets the effluent quality standards that it demands. While a tighter 90S grade ZetaPlus® is found to provide the desired effluent quality, it is deemed by the customer to provide for an unacceptable life. By serially-combining the two filter medium, the necessary effluent quality and longer in-line life may be obtained, however, the serial combination would require installation of a second housing which unacceptably adds to the client's capital and operational costs. Further, the client understands that there is greater down time involved in replacing filters that are housed in separate housings. A graded pore size ZetaPlus® cartridge with 60S and 90S grade layers is found to be the best option since it maintains the acceptable in-line life, while improving effluent quality, without the need to install and maintain a second housing.

Example 2

A customer is currently using a ZetaPlus® grade 50S product as a pre-filter to a downstream membrane filter. The customer asserts that the combined filters meet the effluent quality standards that it demands, but fails to meet its requirement for in-line life. A more open 30S grade of ZetaPlus®, while not significantly affecting effluent quality, is found to reduce in-line life by permitting more rapid build-up on the membrane filter. A tighter 60S grade, while not significantly affecting effluent quality, is found to reduce in-line life by permitting more rapid build-up on the 60S medium. A medium of graded-pore size construction from 30S to 60S is found-to increase in-line life by minimizing build-up on both the membrane and graded-pore size pre-filter, while maintaining acceptable effluent quality.

Example 3

A customer is currently using a ZetaPlus® grade 90S product as a pre-filter to a downstream membrane filter. The customer asserts that the combined filters provide acceptable effluent quality, but only marginal to unacceptable in-line life, as it allows the membrane to plug and have a short service life. No tighter ZetaPlus® grade exists than the grade 90S product. One option is to install a non-ZetaPlus® medium prior to the membrane that traps more particulates, such as the Polypro XL 020P1 pleated filter medium. This option provides good effluent quality and in-line life but requires another type of housing to be inserted in-line adapted for housing the Polypro XL 020P1 pleated filter medium, thus adding to capital and operational costs. Adding the Polypro XL 020P1 medium between the 90S medium and the membrane also permits enhanced in-line life, however, requires yet a third housing to be place in line with the other housings, again adding to capital and operational costs. Another option is to provide a filter medium comprised of layered ZetaPlus® grade 90S and Polypro XL 020P1 in place of the ZetaPlus® grade 90S pre-filter alone. Such system does not require a third filter housing, and if fabricated in the shape of the ZetaPlus® grade 90S filter, a new housing to fit the filter. Such system would provide good in-line filter life and good effluent quality. A third option is to provide a layered ZetaPlus® grade 90S and membrane medium in the shape of the ZetaPlus® grade 90S pre-filter, which would also provide good in-line filter life and effluent quality.

In order to demonstrate the efficacy of the presently described disclosure with respect to commercially available grades of lenticular filter material, a series of experiments (Examples 4–6) were undertaken using Zeta-Plus™ brand filter medium having different degrees of pore size designated by grade.

Permeability of the filter medium was measured as the pressure drop in inches of water when 20 SCFH of air was passed through a three-inch diameter, 7.1 square inch, —cross section of the medium. Life expectancy of the filter, as well as efficiency of filtration, was adjudged by challenging the filter medium with a cell lysate prepared as follows:

E. coli ATCC #49696 was grown in Luria-Bertani Broth (10 g/l tryptone, 5 g/l yeast extract, 10 g/l NaCl, distilled water 5 liters). Cells were cultured until they reached mid to late exponential stage, and then centrifuged down to a pellet at 17,000×g (10,000 RPM in a JA-10 rotor) for 30 minutes at 4° C. The cells were then re-suspended in 10 mM Tris HCl (ph 8.0), respun, and washed once more. After the second washing phase, the cells were lyzed by re-suspending the pellets (1 g/80 ml) in 30 mM Tris HCl (pH 8.0) containing 20% sucrose. After stirring from 60 to 90 minutes, potassium EDTA and lysozyme were added to 10 mM and 0.5 mg/ml respectively. The resulting solution was stirred for 30–45 minutes. The cell solutions were then aseptically returned to centrifuge tubes and a pellet was obtained. The pellets were re-suspended in sterile distilled water and the tubes were placed into a freezer at −70° C. overnight. The tubes were then allowed to thaw. Such freeze/thaw procedure was repeated a total of three times to ensure adequate lysis. After the final freeze/thaw, the tubes were pooled and stirring was performed for at least 30 minutes. In order to minimize enzymatic breakdown of the lysate components by various proteases, the lysate was placed in a refrigerator at 4° C. or freezer at −20° C.

Filter life was adjudged by the initial volume of filtrate passed through the filter to reach 20 psid over initial pressure (measured in gallons/ft$^2$). Efficiency was adjudged from the clarity of the filtrate collected from the filtration system tested. Challenge with the cell lysate was carried out at a pH of about 6.8 to 7.3.

Example 4

Full-thickness 60 grade medium was compared to half-thickness 60 grade medium combined with either half-thickness 30, or half thickness 10, grade medium. When combined the two half-thickness filter mediums were of the same dimension as the full thickness 60 grade medium. Likewise, each half-thickness filter medium layer was substantially dimensioned the same as the other. As demonstrated by the data in Table 1, life of the filter was dramatically improved by combining half-thickness 30 grade medium to half-thickness 60 grade medium as compared to full-thickness 30 or 60 grade alone. Addition of half-thickness 10 grade medium with the half-thickness 60 grade medium provided significantly improved life over full thickness 30 and 60 grade medium, and the combined half-thickness 30/60 grade medium. No practically significant difference between filter efficiencies was discerned between the grades and grade combinations.

TABLE 1

| | | UPPER LAYER | | LOWER LAYER | |
|---|---|---|---|---|---|
| Grade | Life | Weight | Permeability | Weight | Permeability |
| 30 | 23.8 | — | — | 16.3 | 17 |
| 60 | 8.9 | — | — | 17.6 | 93 |
| 30/60 | 28.8 | 8.3 | 12 | 9.6 | 63 |
| 10/60 | 36.5 | 8.7 | 8 | 9.6 | 63 |

Example 5

Full-thickness 90 grade medium was compared to half-thickness 90 grade medium combined with either half-thickness 60, half thickness 30, or half-thickness 10, grade medium. When combined the two half-thickness filter medium was of the same dimension as the full thickness 90 grade medium. Likewise, each half-thickness filter medium layer was substantially dimensioned the same as the other. As demonstrated by the data in Table 2, life of the filter was dramatically improved by combining half-thickness 10, 30, and 60 grade medium to half-thickness 90 grade medium as compared to full-thickness 90 grade alone. Improvement in life of the filter paralleled the openness of the particular grade. No practically significant difference between filter efficiencies was discerned between the grades and grade combinations.

TABLE 2

| Grade | Life | UPPER LAYER | | LOWER LAYER | |
|---|---|---|---|---|---|
| | | Weight | Permeability | Weight | Permeability |
| 90 | 4.06 | — | — | 16.9 | 196 |
| 60/90 | 5.59 | 9.6 | 63 | 7.7 | 92 |
| 30/90 | 17.74 | 8.3 | 12 | 7.7 | 92 |
| 10/90 | 43.3 | 8.7 | 8 | 7.7 | 92 |

Example 6

Half-thickness 120 grade medium was combined with either half-thickness 60, half-thickness 30, or half-thickness 05, grade medium to form combination filters of approximately the same dimension. As demonstrated by the data in Table 3, life of the filter was dramatically improved by up to 60 grade, but remained relatively flat, or slightly diminished, thereafter. No practically significant difference between filter efficiencies was discerned between the grade combinations.

TABLE 3

| Grade | Life | UPPER LAYER | | LOWER LAYER | |
|---|---|---|---|---|---|
| | | Weight | Permeability | Weight | Permeability |
| 90/120 | 1.38 | 7.7 | 92 | 12.7 | 276 |
| 60/120 | 4.24 | 9.6 | 63 | 12.7 | 276 |
| 30/120 | 4.05 | 8.3 | 12 | 12.7 | 276 |
| 05/120 | 3.97 | 8.9 | 2 | 12.7 | 276 |

Edge Seal Examples

A test was conducted to analyze the problem of filter element buckling during the hot flush cycle and subsequent post flush periods. The test involved a computer finite element analysis which compared lenticular filter units having edge seals formed from four different materials of construction: polypropylene (Phillips 66, Marlex™); a thermoplastic elastomer comprising polypropylene/EPDM (Advanced Elastomers, Santoprene® (201–73)); Polysulfone (Amoco, Udel™ P1700); and nylon 6/6 (Dupont, Zytel™ 101). As shown in the table below, the analysis established that filtration units prepared with edge seals formed from polypropylene, polysulfone, or nylon are relatively more prone to medium buckling during the hot flush cycle period than those filtration units prepared with edge seals formed from Santoprene® rubber. Tables 1 through 5 provide comparative data relating to the mechanical characteristics of each of the tested materials.

TABLE 1

Stiffness Characteristics of Polypropylene (Phillips 66, Marlex ™)

| Temperature (° F.) | Elastic Modulus (psi) |
|---|---|
| 73 | 3.2e5 |
| 180 | 1.4e5 |

TABLE 2

Stiffness Characteristics of Thermoplastic Elastomer (Advanced Elastomers, Santoprene ® 201–73)

| Temperature ° F. | Elastic Modulus (psi) |
|---|---|
| 73 | 2300 |
| 212 | 840 |
| 257 | 280 |

TABLE 3

Stiffness Characteristics of Polysulfone (Amoco Udel ™ P1700)

| Temperature ° F. | Elastic Modulus (psi) |
|---|---|
| 70 | 3.90e5 |
| 200 | 3.65e5 |
| 300 | 3.15e5 |

TABLE 4

Stiffness Characteristics of Nylon 6/6 (Dupont Zytel ™ 101)

| Temperature ° F. | Elastic Modulus (psi) (Dry) | Elastic Modulus (psi) (50% Humid) |
|---|---|---|
| 70 | 4.1e5 | 1.75e5 |
| 170 | 1.0e5 | 0.82e5 |
| 250 | 0.78e5 | 0.60e5 |

TABLE 5

Mechanical Characteristics of Materials Compared in Simulation

| Edge Seal Material | Solidification Temp. (° F.) | Expansion Coefficient (in/in/° F.) |
|---|---|---|
| Polypropylene | 250 | 2.1e-5 |
| Santoprene | 208 | 1.18e-4 |
| Polysulfone | 371 | 3.1e-5 |
| Nylon 6/6 | 491 | 4.5e-5 |

The computer simulation included a finite element model of a filtration assembly including two medium elements, a separator, and an edge seal. The analysis procedure was designed to accurately simulate the manufacturing history of a filter element, from assembly to mold cooling, and through hot-flush to the post-flush cooling period. The procedure included the following simulated steps: 1) expanding the edge seal thermally to allow medium closure; 2) closing the medium elements by the application of axial edge pressure; 3) contracting the edge seal to capture the edge of the cell medium elements; 4) removing the medium closure pressure; 5) cooling the edge seal from mold temperature to room temperature to induce fabrication stresses therein; 6) heating the filter assembly while applying a slight lateral pressure to simulate the hot flush cycle, and including medium water absorption as a thermal expansion effect; and 7) cooling the edge seal while retaining wet medium components to simulate the post flush period.

TABLE 6

Radial Displacement of Filtration Unit

| Edge Seal Material | Post Fabrication | Hot Flush | Post Flush |
|---|---|---|---|
| Polypropylene | −.025 in | −.011 in | −.023 in |
| Thermoplastic Elastomer | −.008 in | .051 in | .036 in |
| Polysulfone | −.049 in | −.029 in | −.047 in |
| Nylon 6/6 (Dry) | −.097 in | N/A† | N/A† |
| Nylon 6/6 (Humid) | −.098 in | N/A† | N/A†---- |

†radial displacement value not calculable due to unpredictable buckling

Table 6 sets forth the calculated values of the radial displacement of the filtration units derived from the computer simulation. Table 6 establishes that the radial displacement of a filtration unit having an edge seal formed from Santoprene® thermoplastic elastomer subsequent to fabrication, i.e., after cooling to room temperature following the injection molding process, is significantly lower than that of the filtration units having edge seals formed from either polypropylene, polysulfone, or nylon 6/6 in both a dry state and a humid state. The computer simulation further establishes that the radial displacement of a filtration unit having an edge seal formed from Santoprene® thermoplastic elastomer and a cell medium comprising cellulose, diatomaceous earth and a binder, during a hot wash cycle i.e., when the cell medium expands due to fluid absorption and the cell is subjected to elevated temperatures, is positive, while that of the filtration units having edge seals formed from either polypropylene or polysulfone is negative, indicating that the Santoprene® thermoplastic elastomer edge seal expands in conjunction with the cell medium during the hot flush cycle.

Referring again to the drawings and particularly to FIGS. 8 and 9, which are enlarged localized views of the outer portion of filtration units 16, 18, and 20, as illustrated in FIG. 2, a representative cross-section of filtration unit 20" is shown to illustrate the change in dimensional characteristics of a filtration cell, having a separator 33 and an edge seal 22 constructed from Santoprene® thermoplastic elastomer from a dry state (FIG. 8) to a wet state (FIG. 9) during a hot flush cycle. As illustrated, when the filter medium elements 27 and 28 swell in size due to fluid absorption, together with the compliant edge seal 22, the radius of filtration unit 20 increases by a distance "x".

The computer simulation further established that the radial displacement of a filtration unit having an edge seal formed from Santoprene® rubber during the post flush period, i.e., when the filtration unit cools to room while the cell medium remained in an expanded state due to fluid absorption, is once again positive, while that of the filtration units having edge seals formed from either polypropylene or polysulfone is negative, indicating that the Santoprene® rubber edge seal remains in an expanded condition even after cooling. This result is attributable to the modulus of elasticity of the Santoprene® rubber, which is low enough to permit the edge seal to comply with the forces exerted by the radially expanded filter medium.

In actual lab testing, sample filtration units were sealed on the edge with either polypropylene alone or Santoprene® alone. Such filtration units were subsequently exposed to a hot water flush (80° C.). The filtration units which had their edges sealed with polypropylene alone demonstrated significant and noticeable buckling and distortion of the units within one hot water flush. On the other hand, those filtration units which had their edges sealed with either Santoprene® 271-73 (hardness: 73 Shore A) or 273-40 (hardness: 40 Shore D) were found to demonstrate no significant buckling or distortion of the units after five hot water flushes. Furthermore, the latter filtration units showed no significant buckling or distortion, even when further exposed to about 121° C. steam sterilization cycle. In short, the elastomeric edge seal of the present disclosure was found to eliminate the gross distortion, which occurred with the exact cartridge construction with the polypropylene edge. The elastomer was found not only to eliminate the typical post thermal exposure shrinkage, but actually expanded in diameter to compensate for the medium swelling to maintain an appreciably flat unit. A low elastic modulus was found to allow the filtration medium to move "like a rubber band", the edge diameter returning to its original dimension after the unit had dried. The Santoprene® grade 273-40 was determined to be presently preferred because it improved the medium to elastomer seal bond and was felt to have a better reverse pressure capability than the lower durometer elastomer. By providing a higher modulus/durometer than the Santoprene® grade 271-73, it also provided more stiffness, permitting better handling in manufacturing.

Therefore, by incorporating additional filter medium zones having larger PRCs and/or CHCs into a conventional cell-type filtration unit in the manner described, particle removal efficiency and retention performance of the stacked filter assembly is significantly improved without affecting the life of the filtration unit and when the improved filtration unit includes an improved edge seal incorporated therein, the resulting filtration unit is significantly less prone to medium buckling than prior art filtration assemblies having an edge seal formulated from prior art materials, as a consequence of stresses induced by the injection molding process, or those which are induced during a hot flush period in which the filter medium and edge seal expand due to liquid absorption and elevated temperatures, or those which are induced during a post flush period in which the edge seal tends to contract as it cools while the cell medium remains in an expanded state due to fluid absorption. Specifically, it is clear that the multi-zone filtration unit of the present disclosure provides for significant advantages over filtration units of the prior art, including improved filtration economics, especially for stacked filtration unit cartridges used as a pre-filter to a downstream membrane filter. By incorporating the membrane medium into the present improved filter, the downstream membrane filter and its housing may be eliminated or its useful life significantly lengthened (if it can't be removed from service due to integrity test requirements). Further, less down time would be anticipated to be spent in checking and replacing one filter rather than in checking and replacing two filters. One also gets, for a wide variety of filter medium, the benefits of longer life with the same PRC versus that of single layer medium having the prior art edge seal.

Although the disk-shaped fluid filtration unit of the present disclosure has been described with respect to presently preferred representative embodiments, it is apparent that modifications and changes can be made thereto without departing from the spirit and scope of the disclosure as defined by the appended claims. While the disclosure has been described with respect to presently preferred representative embodiments, those skilled in the art will readily appreciate that various changes and/or modifications can be made to the disclosure without departing from the spirit or scope of the disclosure as defined by the appended claims.

What is claimed is:

1. A fluid filter unit comprising:
   an upper composite filter medium element;
   a lower composite filter medium element;
   a non-filtering separator element, operatively positioned between the upper composite filter medium element and the lower composite filter medium element; and
   structure operatively connecting the at least two filtration medium elements together, the structure being formed from a material having a tensile modulus of elasticity of about 600 psi to about 35,000 psi at about 73° F. and of about 300 psi to about 10,000 psi at about 212° F., wherein the upper and lower composite filter medium elements comprise:
   at least two zones of filter material, at least one zone of the filter material comprising a fibrous material and filter aids, each of the at least two zones having a different PRG and being positioned such that at least one zone of each filter medium is disposed proximal to the separator element and at least one other zone of each filter medium is disposed distal to the separator element, the zone of filter medium disposed most proximal to the separator element having an increased relative-PRC to the PRC of the zone of filter medium disposed most distal to the separator element.

2. The fluid filter unit of claim 1 wherein the material of the edge seal structure has a hardness of about 50 shore A to about 60 shore D.

3. The fluid filter unit of claim 1 wherein material of the edge seal structure has a hardness of about 70 shore A to about 50 shore D.

4. The fluid filter unit of claim 1 wherein material of the edge seal structure has a hardness of about 80 shore A to about 40 shore D.

5. The fluid filter unit of claim 1 wherein the material of the edge seal structure has a tensile modulus of elasticity from about 2300 to about 27,000 psi at about 730° F. and about 800 to about 5,000 psi at about 212° F.

6. The fluid filter unit of claim 1 wherein the material of the edge seal structure has a tensile modulus of elasticity from about 4700 to about 19,000 psi at about 73° F. and about 1300 to about 2,000 psi at about 212° F.

7. The fluid filter unit of claim 1 wherein the upper composite filter medium element and the lower composite filter medium element further comprising:
   at least one additional filter medium.

8. The fluid filter unit of claim 7 wherein the at least one additional filter medium comprises:
   microporous membrane.

9. The fluid filter unit of claim 8 wherein the microporous membrane is positioned most proximal to the separator.

10. A fluid filter unit comprising:
    an upper composite filter medium element;
    a lower composite filter medium element;
    a non-filtering separator element, operatively positioned between the upper composite filter medium element and the lower composite filter medium element; and
    sealing structure operatively connecting the at least two filtration medium elements together, the structure being formed from a material having a tensile modulus of elasticity of about 600 psi to about 35,000 psi at about 73° F. and of about 300 psi to about 10,000 psi at about 212° F., wherein the upper and lower composite filter medium elements comprise:
    at least two zones of filter material, at least one zone of the filter material comprising a fibrous material and filter aids, each of the at least two zones having a different PRC and being positioned such that at least one zone of each filter medium is disposed proximal to the separator element and at least one other zone of each filter medium is disposed distal to the separator element, the zone of filter medium disposed most proximal to the separator element being capable of removing particles of given size more efficiently than the zone of filter medium disposed most distal to the separator element.

11. The fluid filter unit of claim 10 wherein the material of the edge seal structure has a hardness of about 50 shore A to about 60 shore D.

12. The fluid filter unit of claim 10 wherein material of the edge seal structure has a hardness of about 70 shore A to about 50 shore D.

13. The fluid filter unit of claim 10 wherein material of the edge seal structure has a hardness of about 80 shore A to about 40 shore D.

14. The fluid filter unit of claim 10 wherein the material of the edge seal structure has a tensile modulus of elasticity from about 2300 to about 27,000 psi at about 73° F. and about 800 to about 5,000 psi at about 212° F.

15. The fluid filter unit of claim 10 wherein the material of the edge seal structure has a tensile modulus of elasticity from about 4700 to about 19,000 psi at about 73° F. and about 1300 to about 2,000 psi at about 212° F.

16. The fluid filter unit of claim 10 wherein the upper composite filter medium element and the lower composite filter medium element further comprising:
    at least one additional filter medium.

17. The fluid filter unit of claim 16 wherein the at least one additional filter medium comprises:
    microporous membrane.

18. The fluid filter unit of claim 17 wherein the microporous membrane is positioned most proximal to the separator.

19. A fluid filter unit comprising:
    at least one upper composite filter medium element;
    at least one lower composite filter medium element;
    at least one non-filtering separator element operatively positioned between the at least one upper composite filter medium element and the at least one lower composite filter medium element, each of the at least one upper and the at least one lower composite filter medium elements further comprising:
    at least two zones of filter material, at least one zone of the filter material comprising a fibrous material and filter aids, each zone having a different PRC, such that at least one zone of each medium is disposed proximal to the separator element and at least one other zone of each medium is disposed distal to the separator element, the zone disposed most proximal to the separator element having a greater standardized-PRC than the zone disposed most distal to the separator element; and
    structure operatively connecting the at least two filtration medium elements together, the structure being formed from a material having a tensile modulus of elasticity of about 2300 psi to about 27,000 psi at about 73° F. and of about 800 psi to about 5000 psi at about 212° F.

20. The fluid filter unit of claim 19 wherein material of the edge seal structure has a hardness of about 70 shore A to about 50 shore D.

21. The fluid filter unit of claim 19 wherein material of the edge seal structure has a hardness of about 80 shore A to about 40 shore D.

22. The fluid filter unit of claim 19 wherein the material of the edge seal structure has a tensile modulus of elasticity from about 4700 to about 19,000 psi at about 73° F. and about 1300 to about 2,000 psi at about 212° F.

23. The fluid filter unit of claim 19 wherein the upper composite filter medium element and the lower composite filter medium element further comprising:

at least one additional filter medium.

24. The fluid filter unit of claim 23 wherein the at least one additional filter medium comprises:

microporous membrane.

25. The fluid filter unit of claim 24 wherein the microporous membrane is positioned most proximal to the separator.

26. A fluid filter unit comprising:

at least one upper composite filter medium element;

at least one lower composite filter medium element;

at least one non-filtering separator element operatively positioned between the at least one upper composite filter medium element and the at least one lower composite filter medium element, each of the at least one upper and the at least one lower composite filter medium elements further comprise:

at least two zones of filter material, at least one zone of the filter material comprising a fibrous material and filter aids, each zone having a different PRC, such that at least one zone of each medium is disposed proximal to the separator element and at least one other zone of each medium is disposed distal to the separator element, each succeeding zone towards the separator element from the zone disposed most distal from the separator element has an increased relative-PRC; and structure operatively connecting the at least two filtration medium elements together, the structure being formed from a material having a tensile modulus of elasticity of about 2,300 psi to about 27,000 psi at about 73° F. and of about 800 psi to about 5,000 psi at about 212° F.

27. The fluid filter unit of claim 26 wherein the upper composite filter medium element and the lower composite filter medium element further comprising:

at least one additional filter medium.

28. The fluid filter unit of claim 27 wherein the at least one additional filter medium comprises:

microporous membrane.

29. The fluid filter unit of claim 28 wherein the microporous membrane is positioned most proximal to the separator.

30. The fluid filter unit of claim 26 wherein material of the edge seal structure has a hardness of about 70 shore A to about 50 shore D.

31. The fluid filter unit of claim 26 wherein material of the edge seal structure has a hardness of about 80 shore A to about 40 shore D.

32. The fluid filter unit of claim 26 wherein the material of the edge seal structure has a tensile modulus of elasticity from about 4700 to about 19,000 psi at about 73° F. and about 1300 to about 2,000 psi at about 212° F.

* * * * *